(12) United States Patent
Lin et al.

(10) Patent No.: US 7,652,433 B2
(45) Date of Patent: Jan. 26, 2010

(54) METHOD FOR PROLONGING LIFE SPAN OF PLANAR LIGHT SOURCE GENERATING APPARATUS

(75) Inventors: Wei-Yi Lin, Tuku Township, Yunlin County (TW); Biing-Nan Lin, Taichung (TW); Ming-Chun Hsiao, Jhudong Township, Hsinchu County (TW); Ming-Hung Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 714 days.

(21) Appl. No.: 11/440,641

(22) Filed: May 24, 2006

(65) Prior Publication Data
US 2007/0200509 A1  Aug. 30, 2007

(30) Foreign Application Priority Data
Jan. 16, 2006  (TW)  ............. 95101557 A

(51) Int. Cl.
G09G 3/10 (2006.01)
(52) U.S. Cl. .......... 315/169.4; 315/169.3; 315/291
(58) Field of Classification Search ........ 315/161, 315/167, 169.1, 169.3, 169.4, 291; 313/306, 313/309, 496–499, 506
See application file for complete search history.

(56) References Cited

U.S. PATENT DOCUMENTS

| | | | | |
|---|---|---|---|---|
| 7,122,970 B2 * | 10/2006 | Ono et al. | ........ | 315/169.3 |
| 7,247,995 B2 * | 7/2007 | Osame et al. | ........ | 315/169.1 |
| 7,329,978 B2 * | 2/2008 | Konishi | ........ | 313/306 |
| 7,456,579 B2 * | 11/2008 | Yamazaki et al. | ........ | 315/169.3 |
| 7,462,979 B2 * | 12/2008 | Konishi et al. | ........ | 313/306 |
| 2004/0113532 A1 * | 6/2004 | Oishi et al. | ........ | 313/110 |
| 2006/0022604 A1 * | 2/2006 | Takeuchi et al. | ........ | 315/169.3 |
| 2006/0091780 A1 * | 5/2006 | Minami | ........ | 313/495 |

* cited by examiner

*Primary Examiner*—David Hung Vu
*Assistant Examiner*—Tung X Le
(74) *Attorney, Agent, or Firm*—J.C. Patents

(57) ABSTRACT

A method for prolonging the life span of a planar light source generating apparatus is provided. The planar light source generating apparatus forms an emitting layer not only on a plurality of cathodes but on a plurality of gates as well. Moreover, an anode of the planar light source generating apparatus is electrically connected to a current sensor for reading out a maximum current density when the planar light source generating apparatus operates. To operate the planar light source generating apparatus, a DC square voltage is applied to the cathodes (or gates) while the gates (or the cathodes) are electrically connected to a ground. Once the current density detected by the current sensor drops to a definite ratio of the maximum value, the external voltage supplying the aforementioned cathodes and the gates are switched. Thus, the life span of the planar light source generating apparatus is prolonged.

19 Claims, 5 Drawing Sheets

METHOD FOR PROLONGING LIFE SPAN OF PLANAR LIGHT SOURCE GENERATING APPARATUS

CROSS-REFERENCE TO RELATED APPLICATION

This application claims the priority benefit of Taiwan application serial no. 95101557, filed on Jan. 16, 2006. All disclosure of the Taiwan application is incorporated herein by reference.

BACKGROUND OF THE INVENTION

1. Field of the Invention

The present invention relates to a method for prolonging the life span of a light source generating apparatus. More particularly, the present invention relates to a method for prolonging the life span of a planar light source generating apparatus.

2. Description of the Related Art

The principle of light emission in a field emission display device is based on the occurrence of electron emission at a tip of material in a vacuum environment due to there existing a strong electrical field. These field-emitted electrons leaving a cathode plate accelerate toward a positively charged anode plate and ultimately bombard with fluorescent material disposed thereon to produce light. Conventionally, the cathode plate serves as a source for producing the field electrons and the anode plate serves as a light source. FIG. 1 is a diagram showing a conventional field emission apparatus. As shown in FIG. 1, the electrons emitted from the cathode plate 10 bombard the fluorescent layer 201 disposed on the anode plate 20 to produce light. The cathode plate 10 includes a glass substrate 102 and a gate and emitting layer 101 disposed on the glass substrate 102. FIG. 2 is a top view showing a conventional cathode, a gate and an emitting layer 101, which comprises a plurality of stripe gates 101a and a plurality of stripe cathodes 101b disposed alternately. Furthermore, a plurality of emitting layers 101c is formed on the stripe cathodes 101b.

The anode plate 20 comprises a glass substrate 203, a conductive reflection layer 202 and a fluorescent layer 201. Furthermore, a heat sink 30 is disposed on the glass substrate 203. The fluorescent layer 201 is fabricated using a fluorescent powder capable of generating the three primary colors, i.e. red, blue and green,. for producing white light or simply fabricated using a white fluorescent powder. The electron emission layer 101c is fabricated using a material with a lower work function, for example, molybdenum (Mo), titanium carbide (TiC), tungsten (W), silicon (Si) or carbon nanotube. Thus, the material layer can be used as an emission source for the electron emission layer. The electrons emitted from the emitting layer disposed on the cathode plate 10 bombard against the fluorescent layer 201 disposed on the anode plate 20 and then produce a mixture of red, blue and green light (that is, white light is thus generated) or directly produce white light if the white fluorescent powder is used. However, the conductive reflection layer 202 disposed on the anode plate 20 reflects the white light. The reflected white light may penetrate through the cathode plate 10 and exit from another surface 10a of the cathode plate 10. Thus, if the field emission display device is used as a back light source, the display device is so disposed closely to the cathode plate, in which the surface of the display device facing the cathode plate 10a is used as a light-receiving surface.

As the reflected light needs to penetrate the cathode plate, an electrode layer and a gate layer of the cathode plate are designed in such a way that they are simultaneously formed at a same layer during a same fabricating step. Furthermore, when the field emission display device serves as the back light source for other devices, it is able to generate a planar light source with more uniformly-distributed brightness than other light source, such as, a cold cathode fluorescent lamp (CCFL) or a light-emitting diode (LED). The electrode and the gate of the cathode plate are electrically connected to an AC voltage and a ground respectively so that the electrons emitted from the emitting layer disposed on the cathode bombard against the fluorescent layer 201. However, for the conventional field emission device whose gate is driven by an AC voltage, the emitting layer disposed on the cathodes is unable to produce enough electrons for generating light with sufficient brightness after being used a period of time.

Therefore, for the manufacturers of the display device, there exists an important issue of how to prolong the life span of the planar light source generating apparatus.

SUMMARY OF THE INVENTION

Accordingly, at least one objective of the present invention is to provide a method for prolonging the life span of a planar light source generating apparatus.

To achieve these and other advantages and in accordance with the purpose of the invention, as embodied and broadly described herein, the invention provides a planar light source generating apparatus. The planar light source generating apparatus not only has an emitting layer formed over the cathodes but has an emitting layer formed over the gates as well. To operate the planar light source generating apparatus, a DC square voltage is applied to the gates (or the cathodes) while the cathodes (or the gates) is electrically connected to a ground. When a detected current density drops to a certain ratio of a maximum current density, the external voltage supplying the aforementioned cathodes and gates are switched. In other words, the life span of the planar light source generating apparatus is prolonged after switching over the electron emission to the gates.

According to a first embodiment for prolonging the life span of a planar light source generating apparatus, the apparatus has a plurality of stripe cathodes and a plurality of stripe gates, either of which is driven by a direct current (DC) square voltage. In the present invention, a current sensor such as a current meter is electrically connected to a conductive reflection layer of the planar light source generating apparatus for measuring an electron current density (J) at the cathodes. Most electrons emitted from the cathodes may either bombard against the fluorescent powder layer to produce a mixed white light comprised of red, green and blue colors or bombard against a white fluorescent powder to produce white light. However, the current sensor also picks up a portion of the emitted electrons. In fact, the number of electrons picked up by the current sensor is proportional to the electron current density (J) generated from the cathodes. Meanwhile, the electron current density (J) generated at the cathodes slowly decrease with time through repetitive operation until the situation is so deteriorated that the fluorescent layer no longer produces white light with sufficient brightness. In the present invention, alternatively, a method for measuring the electron current density of the cathodes includes the use of the reading shown by a DC current indicator of a DC voltage device for biasing the anode plate. In general, a biased DC voltage of several thousand volts is applied to the anode plate.

In the present invention, when the electron density detected through the current sensor is attenuated to a first predetermined percentage (any selected percentage value greater than 50%) of the maximum value, the external voltages supplying the stripe cathodes and the stripe gates, respectively, are switched. In other words, the stripe cathodes are coupled to a DC square voltage with an amplitude of about 50V~500V. Using this driving method, the voltage difference between the cathodes and the gates is positive 50V~500V so that the emitting layer disposed on the stripe gates can produce electrons. When the current density detected by the current sensor is attenuated to a second predetermined percentage (any selected percentage value greater than 50%) of the maximum value, the external voltage supplying the stripe cathodes and the stripe gates, respectively, are again switched. Thus, the emitting layer disposed on the stripe cathodes now produces the electrons. The aforementioned steps are repeated until the current density of the emitting layer on the stripe gates or the stripe cathodes is attenuated to 50% of the maximum value, beyond which there will be no switching between the external supplying voltages.

According to the preferred embodiment of the present invention, the external voltage supplying the gates and the cathodes, respectively, are switched when the current sensor detects an attenuation of the current density down to the first predetermined percentage of the maximum value. Thereafter, when the current sensor detects an attenuation of the current density down to the second predetermined percentage of the maximum value, the external voltage supplying the gates and the cathodes are switched again. Furthermore, the first predetermined percentage and the second predetermined percentages are a percentage selected from one of a group values consisting of any percentage greater than 50%. Through the foregoing driving method, the planar light source generating apparatus in the present invention has a life span at least twice the conventional apparatus.

In a second embodiment, when the planar light source generating apparatus with a prolonged life span according to the present invention is first used, the gates are electrically connected to a ground while the cathodes are coupled to a DC square voltage with an amplitude between 50V~500V. This connection is maintained until the current sensor detects an attenuation of the current density to a value between 50%~75% of the maximum at a later time. Thereafter, the connections are interchanged so that the cathodes are electrically connected to a ground while the gates are coupled to a DC square voltage with an amplitude between 50V~500V.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
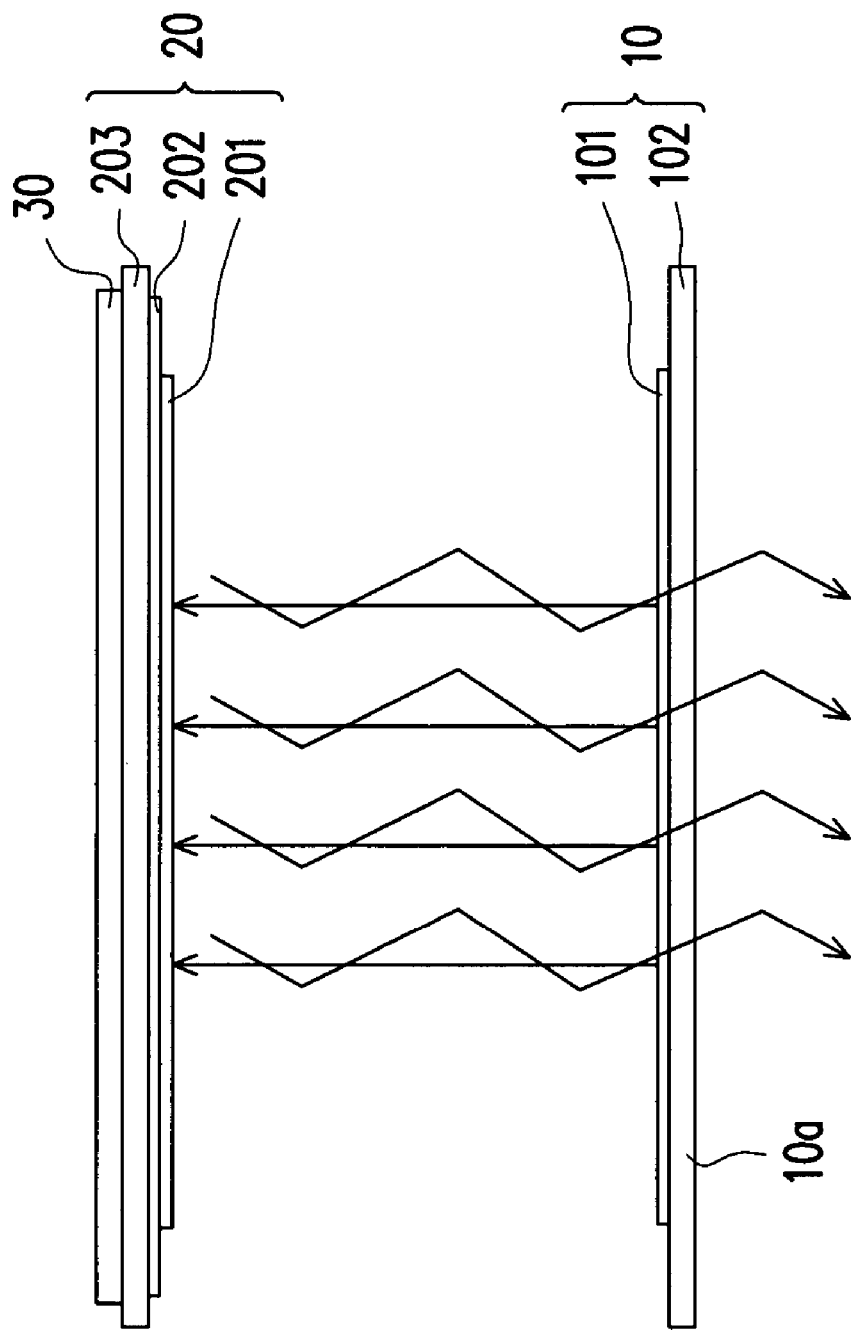
FIG. 1 is a diagram showing a conventional field emission apparatus.

Reference will now be made in detail to the present preferred embodiments of the invention, examples of which are illustrated in the accompanying drawings. Wherever possible, the same reference numbers are used in the drawings and the description to refer to the same or like parts.

According to the embodiment of the present invention, a field emission display device, when used as a back light source, is disposed closely to a cathode plate so that a surface of the display device facing a cathode plate 10a is referred as a light receiving surface.

Figure 3:
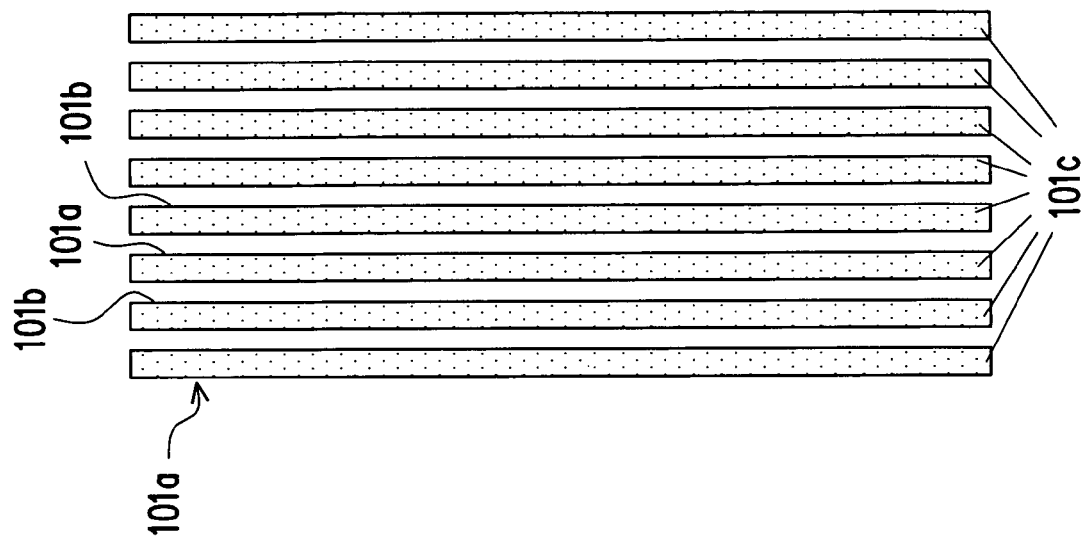
FIG. 3 is a top view showing the cathodes, the gates and the emitting layers of a field-emitted planar light source generating apparatus according to one preferred embodiment of the present invention.

FIG. 3 is a top view showing a cathode, a gate and an emitting layers of a planar light source generating apparatus with a prolonged life span according to one preferred embodiment of the present invention. To simplify the following explanation, the preferred embodiment of the present invention has stripe-shaped cathodes and gates. Alternatively, the cathodes have the same shape as the gates in which the shape is a wavy shape or another regular geometry. Furthermore, the stripe gates 101a and the stripe cathodes 101b are interleaved. In addition, an emitting layer 101c is disposed not only on the stripe cathodes 101b but also on the stripe gates 101a as well. The steps for forming the emitting layer on the stripe gate electrodes 101a and the stripe cathode electrodes 101b include stirring synthetic carbon nanotube (CNT) or material with field-emission properties into a paste and spreading the carbon nanotube or material paste on the foregoing electrodes in a screen-printing process. Alternatively, the steps for forming the emitting layers on the stripe gates 101a and the stripe cathodes 102a include forming a carbon nanotube layer or a material layer with field-emission properties directly on the electrodes. Obviously, the emitting layers can be fabricated using molybdenum (Mo), silicon (Si), zinc oxide (ZnO), carbon fiber or graphite.

Therefore, electrons for bombarding the fluorescent layer 201 in the planar light source generating apparatus, are provided not only by the plurality of stripe cathodes 101b but by the plurality of stripe gates 101a as well. Through the structure with either the stripe cathodes 101b or the stripe gates 101a driven by a DC square voltage to produce electrons, the average life span of the planar light source generating apparatus is prolonged.

Figure 4:
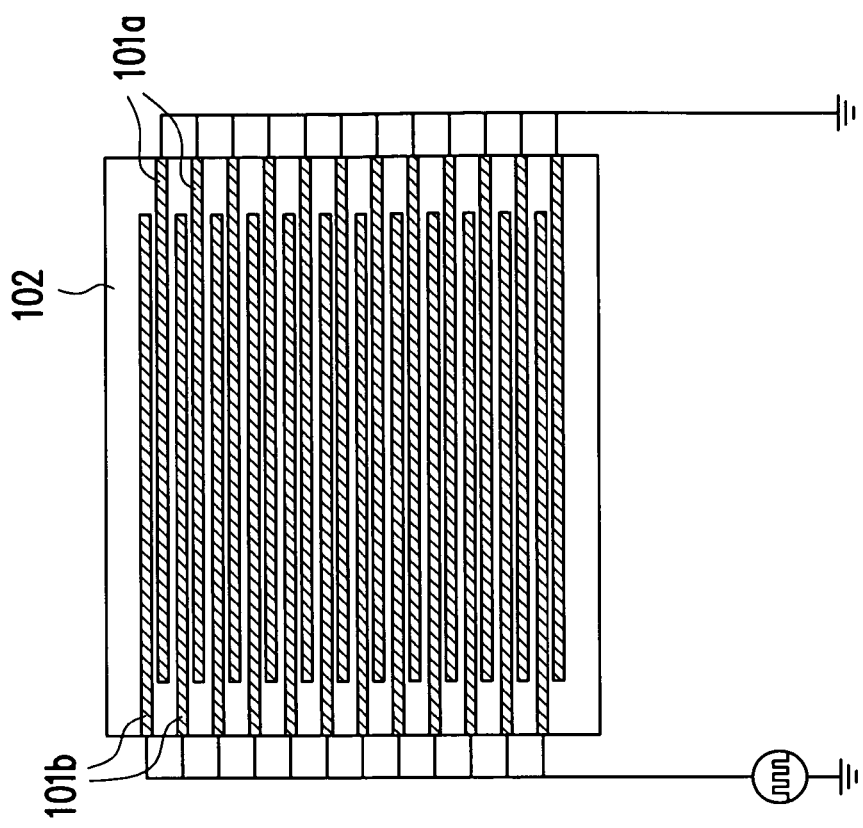
FIGS. 4 and 5 are circuit diagrams showing a DC square voltage applied to the cathodes and gates of a planar light source generating apparatus according to a first embodiment of the present invention.
Figure 5:
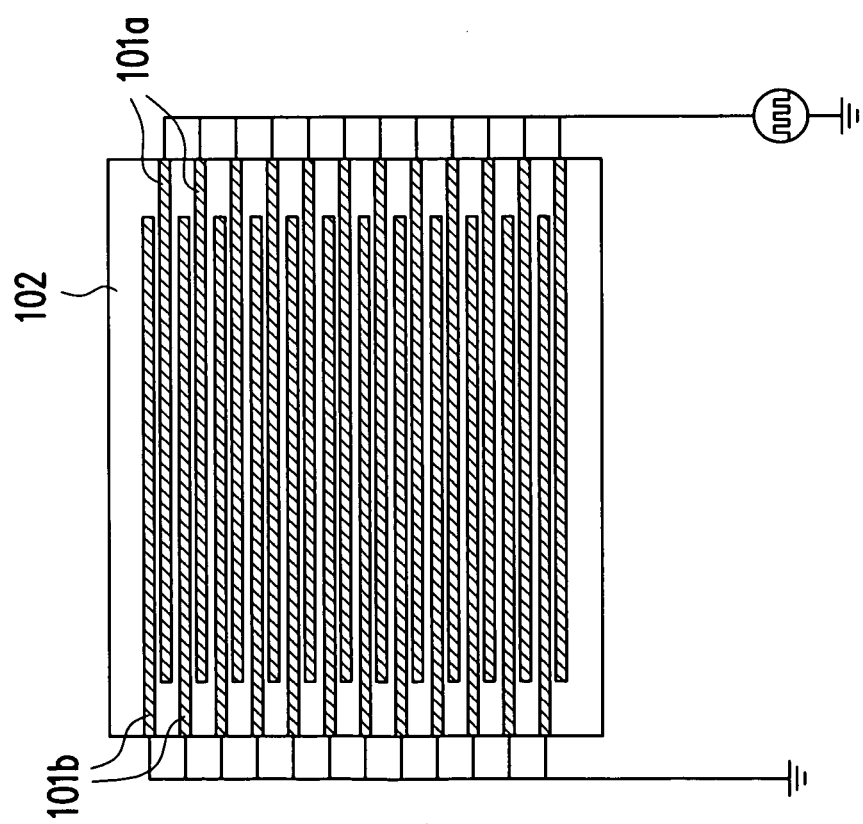

FIGS. 4 and 5 are circuit diagrams showing a DC square voltage applied to the cathodes and gates of a planar light source generating apparatus according to a first embodiment of the present invention. As shown in FIGS. 4 and 5, the transparent glass substrate is labeled 102. The stripe cathodes 101b are all electrically connected to a ground while the stripe gates 101a are coupled to a DC square voltage having an amplitude of between 50V~500V. Through this driving mode, the voltage difference between the cathodes 101b and the gates 101a is negative 50V~500V so that the emitting layer 101c disposed on the stripe cathodes 101b can produce electrons.

Figure 7:
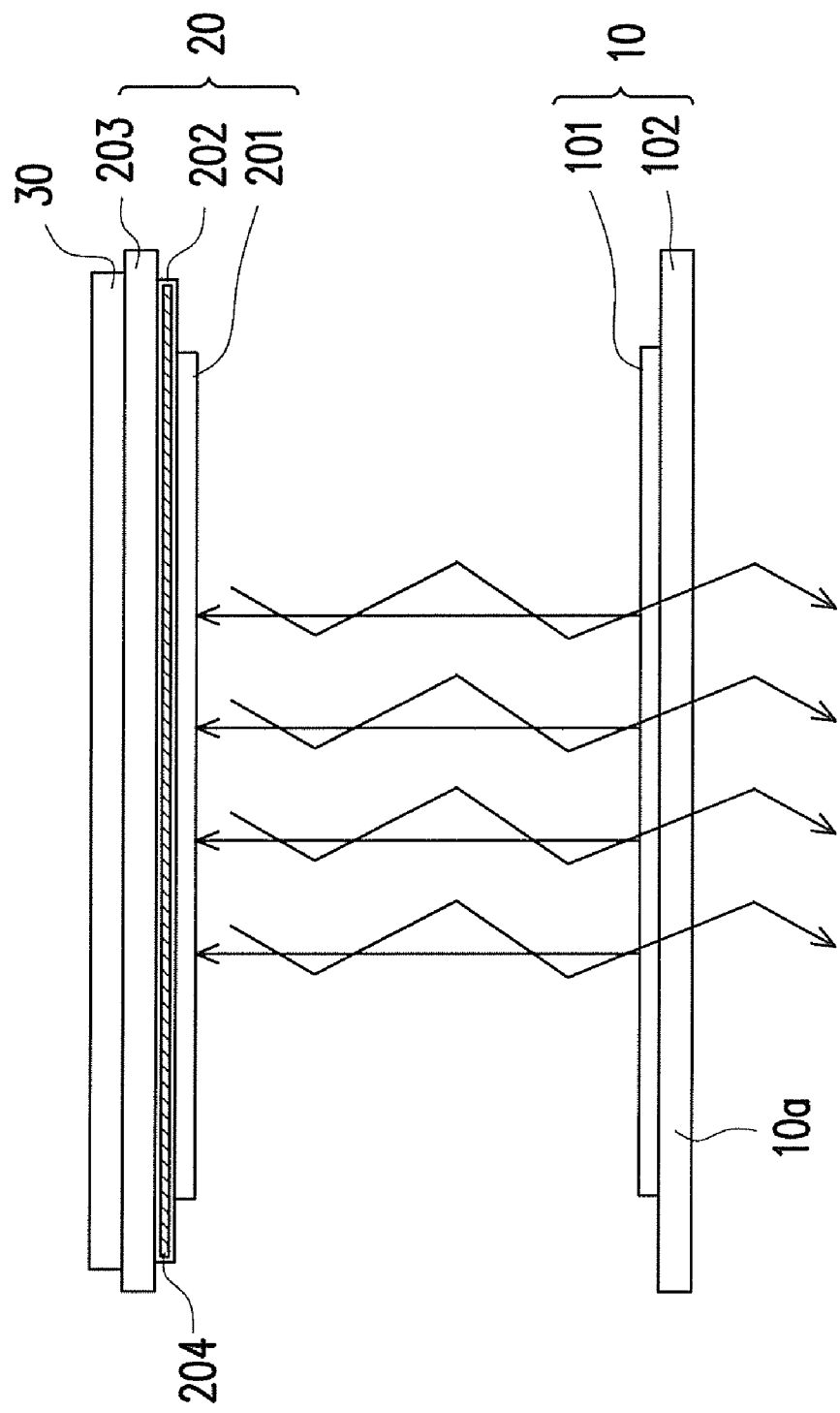
FIG. 7 is a diagram showing a field emission apparatus according to an embodiment of the present invention.

In the meantime, referring to FIG. 7. which is a diagram showing a field emission apparatus according to an embodiment of the present invention, a current sensor 204 such as a current meter is installed in the planar light source generating apparatus 202 for measuring the current density (J) of the cathodes. Most of the electrons emitted from the cathodes bombard the fluorescent powder disposed on the fluorescent layer to produce white light. However, the current sensor picks up a small portion of the electrons that bombard against the conductive reflection layer. Furthermore, the number of electrons received by the current sensor will be proportional to the electron current density (J) at the cathodes. Additionally, once the planar light source generating apparatus starts to operate, a current density detected by the current sensor is referred as the maximum current density. In the present invention, another method of measuring the current density at the cathodes includes the use of reading a value shown by a DC current meter of a DC voltage device for biasing the anode plate. In general, a biased DC voltage of several thousand volts is applied to the anode plate. This is feasible because most commercial DC voltage devices are provided with a DC current meter. Through the DC current meter, the current density value can be directly read from the DC voltage device without specifically installing a current meter.

Figure 2:
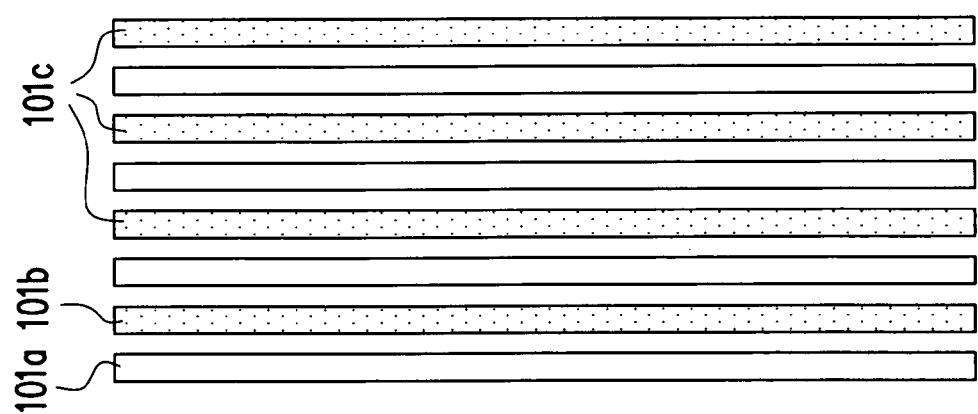
FIG. 2 is a top view showing a conventional cathode, a gate and an emitting layer.

Meanwhile, the current density (J) of the electrons emitted from the cathodes attenuates with time so that there are no sufficient electrons to bombard the fluorescent layer, which results in a failure to produce white light with desired brightness. If the conventional field-emitted apparatus as shown in FIG. 2 is used, the cathodes are at the end of the useful life span and the apparatus can no longer be used. In the present invention, the current sensor monitors the attenuation of the current density. When the current density is attenuated to a first predetermined percentage (any percentage greater than 50%) of the maximum value, the external supplying voltage to the stripe cathodes and the stripe gates are switched (as shown in FIG. 5). In other words, as shown in FIG. 5, the stripe cathodes 101b are coupled to a DC square voltage having an amplitude between 50V~500V while the stripe gates 101a are electrically connected to a ground. Through this driving mode, the voltage difference between the cathodes and the gates is positive 50V~500V so that the emitting layer disposed on the stripe gates can generate electrons. Thereafter, when the current density detected by the current sensor is attenuated to a second predetermined percentage (the value selected from any percentage value greater than 50%), the external supplying voltage to the stripe cathodes and the stripe gates are again switched. Hence, the emitting layers disposed on the stripe cathodes now generate the required electrons. The aforementioned steps of switching the external supply voltages are repeated until the electron current density from the emitting layer of the stripe gates or the stripe cathodes is attenuated to about 50% of the maximum value. In other words, the switching is continued until the end of the useful life of the planar light source generating apparatus is reached.

Alternatively, a method for prolonging the life span of a planar light source generating apparatus according another embodiment of the present invention, comprises:

applying a DC voltage to a plurality of cathodes of the planar light source generating apparatus, wherein the cathodes have a plurality of emitting layers formed thereon;

applying a ground potential to a plurality of gates of the planar light source generating apparatus, wherein the gates have a plurality of emitting layers formed thereon;

connecting a current sensor to a conductive reflection layer of an anode of the planar light source generating apparatus;

obtaining a maximum electron current density shown by the current sensor once the planar light source generating apparatus starts to operate; and switching the cathodes' external power source from the DC voltage to the ground, and the gates' external power source from the ground to the DC voltage, when the current sensor detects the current density dropping to 30%-70% of the maximum current density. In other words, in this embodiment, the cathodes' and the gates' external power sources are switched only one time, rather than several times in the first embodiment.

In the present embodiment, the first predetermined percentage and the second predetermined percentage are selected according to the experience of the user. The first and the second predetermined percentage can be chosen to be different or identical value, such as 75%. Thereafter, a third and a fourth predetermined percentage can be selected whose value can be chosen to be different or identical, such as 50%. In addition, the gates and the cathodes in the present embodiment are not restricted to a stripe shape. Other shapes such as a wavy shape or some regular geometric shape are also permitted.

According to the preferred embodiment of the present invention, the external voltage supplying the gates and the cathodes are switched when the current sensor detects an attenuation of the current density down to the first predetermined percentage of the maximum value. Thereafter, when the current sensor detects an attenuation of the current density down to the second predetermined percentage of the maximum value, the external voltage supplying the gates and the cathodes are switched again. Furthermore, the first predetermined percentage and the second predetermined percentages are a percentage selected from one of a group values consisting of any percentage greater than 50%. Through the foregoing driving mode, the planar light source generating apparatus in the present invention is able to have a life span at least double that of the conventional apparatus.

Figure 6:
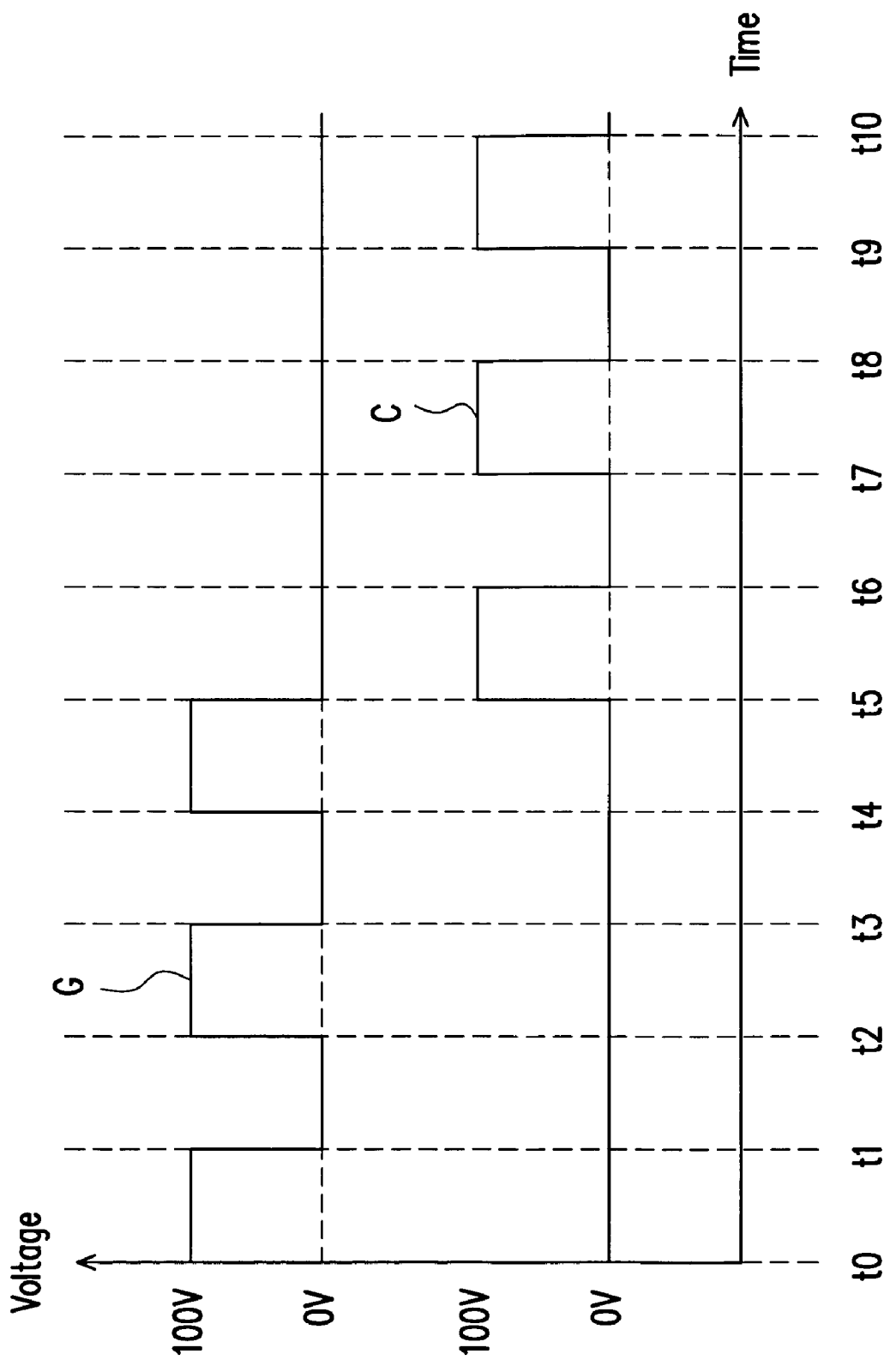
FIG. 6 is a timing diagram showing the waveform a DC square voltage for driving the cathodes and the gates of the planar light source generating apparatus according to the first embodiment of the present invention.

FIG. 6 is a timing diagram showing the waveform a DC square voltage for driving the cathodes and the gates of the planar light source generating apparatus according to the first embodiment of the present invention. When the planar light source generating apparatus with prolonged life span according to the present invention is first used, the cathodes 101b are electrically connected to the ground while the gates 101a are coupled to a DC square voltage G with about 100V amplitude. On reaching the time axis t=t5, the current sensor detects a dropping of the current density to only 50% of the maximum value. Then, the gates 101a are switched from connecting to the external DC square voltage to the ground while the cathodes 101b are switched from the ground to the DC square voltage C with about 100V amplitude. As a result, the life span of the apparatus is prolonged.

Obviously, in a second embodiment of the present invention, when the planar light source generating apparatus with a prolonged life span is first used, the gates 101a can be electrically connected to the ground while the cathodes 101b can be electrically connected to a DC square voltage with amplitude of about 100V (not shown in the figure). After a specific time, the current sensor detects the electron current density attenuated to only 50% of the maximum value. Hence, the external supplying voltage between the cathodes and the gates are switched. In other words, the cathodes 101b are changed to be connected to the ground and the gates 101a are changed to be connected to a DC square voltage with about 100V amplitude. As a result, the life span of the apparatus is prolonged.

In summary, the method of extending the life span of a planar light source generating apparatus according to the present invention has at least one major advantage. The planar light source generating apparatus has emitting layers disposed not only over the stripe cathodes but the stripe gates 101a as well so that both can generate electrons. Therefore, the gates 101a can be used to generate electrons when the cathodes 101b have worked past half of its life. In other words, the apparatus has an effective life span at least double that of a conventional apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for prolonging the life span of a planar light source generating apparatus, comprising:
    applying a DC voltage to a plurality of cathodes of the planar light source generating apparatus, wherein the cathodes have a plurality of emitting layers formed thereon;
    applying a ground potential to a plurality of gates of the planar light source generating apparatus, wherein the gates have a plurality of emitting layers formed thereon;
    connecting a current sensor to a conductive reflection layer of an anode of the planar light source generating apparatus;
    obtaining a maximum electron current density shown by the current sensor once the planar light source generating apparatus starts to operate;
    switching the cathodes' external power source from the DC voltage to the ground, and the gates' external power source from the ground to the DC voltage, when the current sensor detects the current density dropping to a first predetermined percentage of the maximum current density;
    switching the cathodes' external power source from the ground to the DC voltage, and the gates' external power source from the DC voltage to the ground, when the current density detected by the current sensor is attenuated to a second predetermined percentage of the maximum value; and
    repeating the foregoing steps until the current density of the emitting layer disposed on the gates or the cathodes is attenuated to 50% of the maximum electron current density so that no switching between the external power sources is carried out, wherein the first predetermined percentage and the second predetermined percentages are selected from one of a group values consisting of any percentage greater than 50%.

2. The method of claim 1, wherein the applied DC voltage is a DC square voltage.

3. The method of claim 1, wherein the first predetermined percentage and the second predetermined percentage are an identical value or different values.

4. The method of claim 1, wherein the current sensor is a current meter.

5. The method of claim 1, wherein the cathodes and the gates of the planar light source generating apparatus are configured to be interleaved and the cathodes have the same shape as the gates in which the shape is a wavy shape or another regular geometry.

6. The method of claim 1, wherein the material constituting the emitting layers is selected from a group consisting of molybdenum (Mo), silicon(Si), zinc oxide (ZnO), carbon fiber and graphite.

7. The method of claim 1, wherein the steps of applying a DC voltage to a plurality of cathodes and applying a ground potential to a plurality of gates of the planar light source generating apparatus, are replaced with applying the ground potential to the cathodes and applying the DC voltage to the gates, and further comprises:
    switching the cathodes' external power source from the ground potential to DC voltage, and the gates' external power source from the DC voltage to the ground potential, when the current sensor detects the current density dropping to a first predetermined percentage of the maximum current density;
    switching the cathodes' external power source from the DC voltage to the ground potential, and the gates' external power source from the ground potential to the DC voltage, when the current density detected by the current sensor is attenuated to a second predetermined percentage of the maximum value; and
    repeating the foregoing steps until the current density of the emitting layer disposed on the gates or the cathodes is attenuated to 50% of the maximum electron current density so that no switching between the external power sources is carried out, wherein the first predetermined percentage and the second predetermined percentages are selected from one of a group values consisting of any percentage greater than 50%.

8. A method for prolonging the life span of a planar light source generating apparatus, comprising the steps of:
    applying a DC voltage to a plurality of cathodes of the planar light source generating apparatus, wherein the cathodes have a plurality of emitting layers formed thereon;
    applying a ground potential to a plurality of gates of the planar light source generating apparatus, wherein the gates have a plurality of emitting layers formed thereon;
    obtaining a maximum electron current density shown by a DC current indicator of a DC voltage device for biasing an anode plate of the planar light source generating apparatus, once the planar light source generating apparatus starts to operate; switching the cathodes' external power source from the DC voltage to the ground, and the gates' external power source from the ground to the DC voltage, when a current sensor detects the current density dropping to a first predetermined percentage of the maximum current density;
    switching the cathodes' external power source from the ground to the DC voltage, and the gates' external power source from the DC voltage to the ground, when the current density detected by the current sensor is attenuated to a second predetermined percentage of the maximum value; and
    repeating the foregoing steps until the current density of the emitting layer disposed on the gates or the cathodes is attenuated to 50% of the maximum electron current density so that no switching between the external power source is carried out, wherein the first predetermined percentage and the second predetermined percentages are selected from one of a group values consisting of any percentage greater than 50%.

9. The method of claim 8, wherein the DC voltage device applies a biased voltage to a conductive reflection layer of the anode plate of the planar light source generating apparatus.

10. The method of claim 8, wherein the DC voltage is a DC square voltage.

11. The method of claim 8, wherein the cathodes and the gates of the planar light source generating apparatus are configured to be interleaved and the cathodes have the same shape as the gates in which the shape is a wavy shape or another regular geometry.

12. The method of claim 8, wherein the material constituting the emitting layers is selected from a group consisting of molybdenum (Mo), silicon(Si), zinc oxide (ZnO), carbon fiber and graphite.

13. The method of claim 8, wherein the steps of applying a DC voltage to a plurality of cathodes and applying a ground potential to a plurality of gates of the planar light source generating apparatus, are replaced with applying the ground potential to the cathodes and applying the DC voltage to the gates, and further comprises:

switching the cathodes' external power source from the ground potential to DC voltage, and the gates' external power source from the DC voltage to the ground potential, when the current sensor detects the current density dropping to a first predetermined percentage of the maximum current density;

switching the cathodes' external power source from the DC voltage to the ground potential, and the gates' external power source from the ground potential to the DC voltage, when the current density detected by the current sensor is attenuated to a second predetermined percentage of the maximum value; and repeating the foregoing steps until the current density of the emitting layer disposed on the gates or the cathodes is attenuated to 50% of the maximum electron current density so that no switching between the external power sources is carried out, wherein the first predetermined percentage and the second predetermined percentages are selected from one of a group values consisting of any percentage greater than 50%.

14. A method for prolonging the life span of a planar light source generating apparatus, comprising:

applying a DC voltage to a plurality of cathodes of the planar light source generating apparatus, wherein the cathodes have a plurality of emitting layers formed thereon;

applying a ground potential to a plurality of gates of the planar light source generating apparatus, wherein the gates have a plurality of emitting layers formed thereon;

connecting a current sensor to a conductive reflection layer of an anode of the planar light source generating apparatus;

obtaining a maximum electron current density shown by the current sensor once the planar light source generating apparatus starts to operate; and switching the cathodes' external power source from the DC voltage to the ground, and the gates' external power source from the ground to the DC voltage, when the current sensor detects the current density dropping to 30%-70% of the maximum current density.

15. The method of claim 14, wherein the steps of applying a DC voltage to a plurality of cathodes and applying a ground potential to a plurality of gates of the planar light source generating apparatus, are replaced with applying the ground potential to the cathodes and applying the DC voltage to the gates and further comprises a step of switching the cathodes' external power source from the ground potential to the DC voltage, and the gates' external power source from the DC voltage to the ground potential, when the current sensor detects the current density dropping to 30%-70% of the maximum current density.

16. The method of claim 14, wherein the applied DC voltage is a DC square voltage.

17. The method of claim 14, wherein the current sensor is a current meter.

18. The method of claim 14, wherein the cathodes and the gates of the planar light source generating apparatus are configured to be interleaved and the cathodes have the same shape as the gates in which the shape is a wavy shape or another regular geometry.

19. The method of claim 14, wherein the material constituting the emitting layers is selected from a group consisting of molybdenum (Mo), silicon(Si), zinc oxide (ZnO), carbon fiber and graphite.

* * * * *